United States Patent
Marcel et al.

(10) Patent No.: US 10,892,673 B2
(45) Date of Patent: Jan. 12, 2021

(54) THRUST PRODUCING SPLIT FLYWHEEL GYROSCOPE METHOD AND APPARATUS

(71) Applicant: Airborne Motor Works Inc., Veradale, WA (US)

(72) Inventors: Jesse Antoine Marcel, Veradale, WA (US); Jeffrey Scott Chimenti, The Woodlands, TX (US)

(73) Assignee: Airborne Motor Works Inc., Veradale, WA (US)

( * ) Notice: Subject to any disclaimer, the term of this patent is extended or adjusted under 35 U.S.C. 154(b) by 38 days.

(21) Appl. No.: 16/525,446

(22) Filed: Jul. 29, 2019

(65) Prior Publication Data

US 2020/0358344 A1 Nov. 12, 2020

Related U.S. Application Data

(60) Provisional application No. 62/703,883, filed on Jul. 27, 2018.

(51) Int. Cl.
*H02K 16/02* (2006.01)

(52) U.S. Cl.
CPC .................................. *H02K 16/025* (2013.01)

(58) Field of Classification Search
CPC ..................................................... H02K 16/025
(Continued)

(56) References Cited

U.S. PATENT DOCUMENTS 3,265,329 A 8/1966 Postelson(Apostolescu)
3,327,538 A 6/1967 Krupick et al.
(Continued)

FOREIGN PATENT DOCUMENTS

CN 104980001 10/2015
JP 3029792 2/2000
(Continued)

OTHER PUBLICATIONS

International Preliminary Report on Patentability dated Oct. 8, 2020, in International Patent Application No. PCT/US19/24696, 6 pages.

(Continued)

*Primary Examiner* — Naishdah N Desai

(74) *Attorney, Agent, or Firm* — Lowe Graham Jones PLLC

(57) ABSTRACT

The present invention is an electric propulsion motor that can be used to propel air, land, and sea vehicles consisting of a gyroscope's flywheel that has been split into two counter rotating sections, perimeter and hub, each section containing spokes that are shaped to produce thrust when rotated, a stator with individually controlled field coils located on its inside and outside diameters, permanent magnets integrated into the flywheel sections proximate to the stator's field coils, and a bearing system to support each flywheel section. The invention is self-contained needing no external propulsion or drive means, self-stabilizing due to the gyroscopic forces created by its spinning hub and perimeter flywheels, thrust producing because of the shape of the spokes of the two flywheels, and rotational torque cancelling with counter rotating flywheel sections. A Chimara Effect is created that both stabilizes and propels the vehicle.

5 Claims, 7 Drawing Sheets

(58) Field of Classification Search
USPC .................................................. 310/74, 153
See application file for complete search history.

(56) References Cited

U.S. PATENT DOCUMENTS

| | | | |
|---|---|---|---|
| 3,396,391 A | 8/1968 | Anderson | |
| 3,845,995 A * | 11/1974 | Wehde | G01C 19/24 |
| | | | 310/90.5 |
| 3,991,487 A | 11/1976 | Bede | |
| 5,454,531 A | 10/1995 | Melkuti | |
| 5,514,923 A | 5/1996 | Gossler et al. | |
| 6,270,038 B1 | 8/2001 | Cycon et al. | |
| 6,431,494 B1 | 8/2002 | Kinkead et al. | |
| 6,919,663 B2 | 7/2005 | Iles-Klumpner | |
| 7,032,861 B2 | 4/2006 | Sanders, Jr. et al. | |
| 7,152,301 B2 | 12/2006 | Rittmeyer | |
| 7,874,513 B1 | 1/2011 | Smith | |
| 8,083,557 B2 | 12/2011 | Sullivan | |
| 8,761,961 B2 | 6/2014 | Lee et al. | |
| 9,649,242 B2 | 5/2017 | Chiu et al. | |
| 10,040,544 B2 | 8/2018 | Marcel | |
| 10,676,180 B2 | 6/2020 | Marcel | |
| 2003/0085319 A1 | 5/2003 | Wagner et al. | |
| 2011/0178711 A1 | 7/2011 | Christoph | |
| 2012/0056040 A1 | 3/2012 | Brotherton-Ratcliffe et al. | |
| 2013/0020429 A1 | 1/2013 | Kroo | |
| 2015/0149000 A1 | 5/2015 | Rischmuller et al. | |
| 2015/0209212 A1 | 7/2015 | Duguid | |
| 2016/0008206 A1 | 1/2016 | Devanaboyina | |
| 2016/0152327 A1 | 6/2016 | Bertels | |
| 2016/0207625 A1 | 7/2016 | Judas et al. | |
| 2017/0073065 A1 | 3/2017 | Von Novak et al. | |
| 2017/0335821 A1 * | 11/2017 | Ohya | F03B 13/26 |
| 2017/0361930 A1 | 12/2017 | Choi et al. | |
| 2019/0300165 A1 | 10/2019 | Marcel et al. | |
| 2020/0140102 A1 | 5/2020 | Marcel et al. | |
| 2020/0230013 A1 | 7/2020 | Marcel et al. | |

FOREIGN PATENT DOCUMENTS

| | | |
|---|---|---|
| RU | 2321765 | 4/2008 |
| RU | 2527248 | 8/2014 |
| RU | 2538737 | 8/2014 |
| WO | 2009/093181 | 7/2009 |
| WO | 2016/153580 | 9/2016 |

OTHER PUBLICATIONS

International Search Report and Written Opinion of the International Searching Authority completed Jul. 12, 2019, in International Patent Application No. PCT/US19/024696, 6 pages.

International Search Report and Written Opinion of the International Searching Authority completed May 12, 2020, in International Patent Application No. PCT/US2019/048191, 7 pages.

International Search Report and Written Opinion of the International Searching Authority completed Apr. 17, 2020, in International Patent Application No. PCT/US2020/014491, 7 pages.

International Search Report and Written Opinion of the International Searching Authority completed Jun. 8, 2020, in International Patent Application No. PCT/US20/23676, 9 pages.

International Search Report and Written Opinion of the International Searching Authority completed Aug. 28, 2016, in International Patent Application No. PCT/US16/12073, 12 pages.

International Search Report and Written Opinion of the International Searching Authority dated Nov. 7, 2019, in International Patent Application No. PCT/US19/43995, 6 pages.

* cited by examiner

THRUST PRODUCING SPLIT FLYWHEEL GYROSCOPE METHOD AND APPARATUS

PRIORITY CLAIM

This application claims the benefit of priority from U.S. Provisional Patent Application No. 62/703,883 filed Jul. 27, 2018, the contents of which application is incorporated herein by reference in its entirety.

FIELD OF THE INVENTION

The present invention relates generally to propulsion methods used to create thrust for propelling aircraft. More specifically, the invention relates to a self-contained propulsion system consisting of an electric gyroscope with that produces thrust while creating balance and stability.

BACKGROUND OF THE INVENTION

Electric aircraft propulsion systems create thrust by connecting an electric motor to an auxiliary means composed of propellers rotors either directly or through a driveshaft and/or gearbox to the motors output shaft. While these methods can provide adequate thrust when correctly sized for their applications, they have less efficiency than a self-contained propulsion method. A second drawback is the innate instability of the propulsion methods, which requires an offsetting means to keep the vehicle stable.

Therefore, a need exists in the field of electric aircraft propulsion systems for a self-contained apparatus with no external motor, providing instead an assembly having a motor with a self-stabilizing gyroscope that produces directional airflow and that can be used to propel personal air vehicles.

SUMMARY OF THE INVENTION

The subject invention comprises a method and apparatus for propelling electric Personal Air Vehicles (PAVs) both efficiently and safely. The invention employs a split flywheel gyroscope with an inner hub section and an outer perimeter section separated by a double-sided stator with two sets of field coils, one set located proximate to the flywheel's hub section and the second proximate to the flywheel's perimeter section. The perimeter and hub flywheels integrate magnets proximate to the appropriate stator coils. Each field coil is linked to a controller, for example, if there are thirty-six field coils then there are 36 controllers, which allows the present invention to instantly change the phasing of electromagnetic fields acting on the flywheel's permanent magnets. The hub flywheel turns counter to the perimeter flywheel with sufficient speed to balance the opposing rotational torque keeping the present invention from rotating. Altering the speed between the two rotors can be used to rotate the present invention to any desired position.

To create thrust, the flywheel spokes in both sections are shaped to provide directed airflow when rotated. In the present invention, the spokes of the hub flywheel couple an interior and exterior ring. The spokes of the perimeter flywheel are attached only to an interior ring. In an alternate embodiment, the spokes of each flywheel section couple interior and exterior rings. In an alternate embodiment, the perimeter flywheel attaches only to an interior ring and the hub flywheel attaches only to an exterior ring. Alternate embodiments are not limited to the above variations and include other interior/exterior ring arrangements with the hub and perimeter flywheels. The gyroscope's hub flywheel is supported by a plurality of rolling element bearings along its outer diameter. The perimeter flywheel is supported along its inner diameter by a plurality of rolling element bearings.

The present invention is a self-contained electric thrust-producing split flywheel hub-less gyroscope method and apparatus that is self-stabilizing due to the gyroscopic forces created by its spinning hub and perimeter flywheels, thrust producing due to the shape of the spokes of the two flywheels, and rotational torque cancelling due to counter rotating flywheel sections.

BRIEF DESCRIPTION OF THE DRAWINGS

These and other features and advantages of the present invention will become more readily appreciated as the same becomes better understood by reference to the following detailed description when considered in connection with the accompanying drawings, wherein.

DETAILED DESCRIPTION OF THE PREFERRED EMBODIMENT

The terminology used herein is for describing embodiments only and is not intended to be limiting for the invention. As used herein the term "and/or" includes all combinations of one or more of the associated listed items. As used herein, the singular forms "a," "an"' and "'the"' are intended to include the plural forms as well as the singular forms, unless the context clearly indicates otherwise. It will be further understood that the terms "comprises" and/or "comprising" when used in this specification, specify the presence of stated features, steps, operations, elements, and/or components. but do not preclude the addition of one or more other features, steps, operations, elements, components, and/or groups thereof.

Unless otherwise defined, all terms used herein, including technical and scientific terms, used herein have the same meaning as commonly understood by one having ordinary skill in the art to which the invention belongs. It will be further understood that terms, such as those defined in commonly used dictionaries, should be interpreted as having a meaning that is consistent with their meaning in the one context of the relevant art and the present disclosure and will not be interpreted in an idealized or overly formal sense unless expressly so defined, herein.

In describing the invention, it will be understood that several techniques and steps are disclosed. Each of these has individual benefit and each can also be used in conjunction with one or more (or in some cases all) of the other disclosed techniques. Accordingly, for the sake of clarity, this description will refrain from repeating every possible combination of the individual steps in an unnecessary fashion. Nevertheless, the specification and claims should be read with the understanding that such combination are entirely within the scope of the invention and the claims.

A new thrust-producing split flywheel gyroscope method and apparatus according to various embodiments for creating a self-leveling, rotational torque eliminating, stable and efficient propulsion system are discussed herein. In the following description, for the purposes of explanation, numerous specific details are set forth in order to provide a thorough understanding of the present invention. It will be evident, however to one skilled in the art that the present invention may be practiced without these specific details.

The present disclosure is to be considered as an exemplification of the invention and is not intended to limit the invention to the specific embodiments illustrated by the figures or description below.

Figure 1:
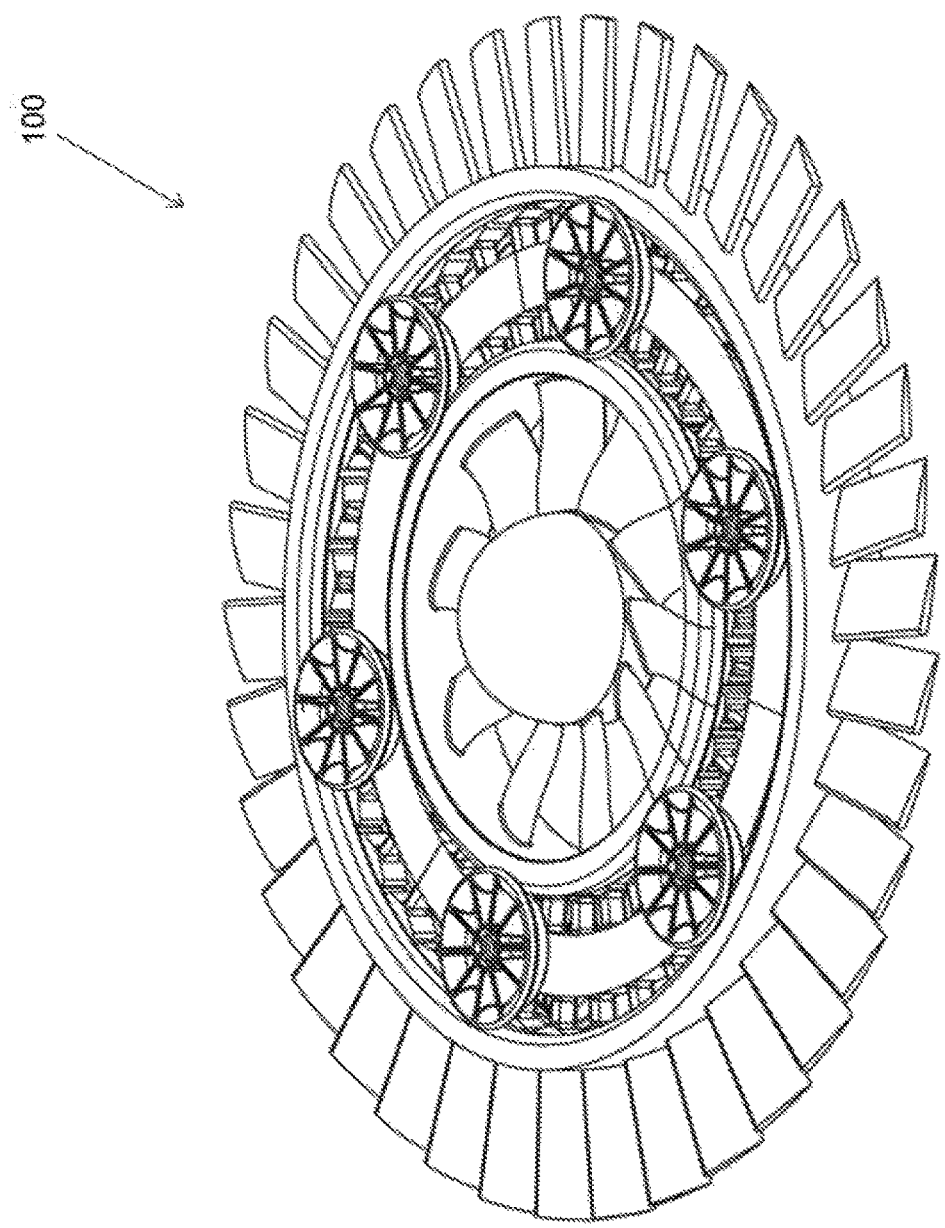
FIG. 1 depicts a perspective view of an assembled thrust producing split flywheel gyroscope method and apparatus according to various embodiments of the present invention.

The present invention will now be described by referencing the appended figures representing preferred embodiments. FIG. 1 depicts a perspective view of the elements that may comprise an assembled thrust producing split flywheel gyroscope apparatus according to the various embodiments of the present invention. In preferred embodiments, the general assembly illustrated with reference to FIGS. 1 and 2 contains each of the elements of the assembly configured with at least one perimeter gyroscope flywheel section 200. The gyroscope flywheel section may be made of lightweight composite materials, aluminum, or another suitable material and is configured to accept a plurality of magnets 201 composed of neodymium or another suitable magnetic material. The plurality of magnets is preferable positioned along the gyroscope's interior between inferior bearing couple 202, which may be made of lightweight composite materials, aluminum, or another suitable material, and superior bearing couple 203, which may be made of lightweight composite materials, aluminum, or another suitable material. In a preferred embodiment the bearing couples lock the magnets in place. The magnets are proximate to ring 205, which may be made of lightweight composite materials, aluminum, or another suitable material, which connect the thrust producing spokes with the superior and inferior bearing couples. A plurality of vertical protrusions separates the magnets when necessary to split the surface area of the gyroscope's perimeter equally. The perimeter flywheel spokes 204, which are affixed to the perimeter gyroscope section, may be made of lightweight composite materials. aluminum, or another suitable material and have a cross-section and positive incidence angle to create desired airflow/thrust when rotated. The faster the revolutions of the gyroscope's flywheel, the greater the thrust and gyroscopic effect.

Figure 3:
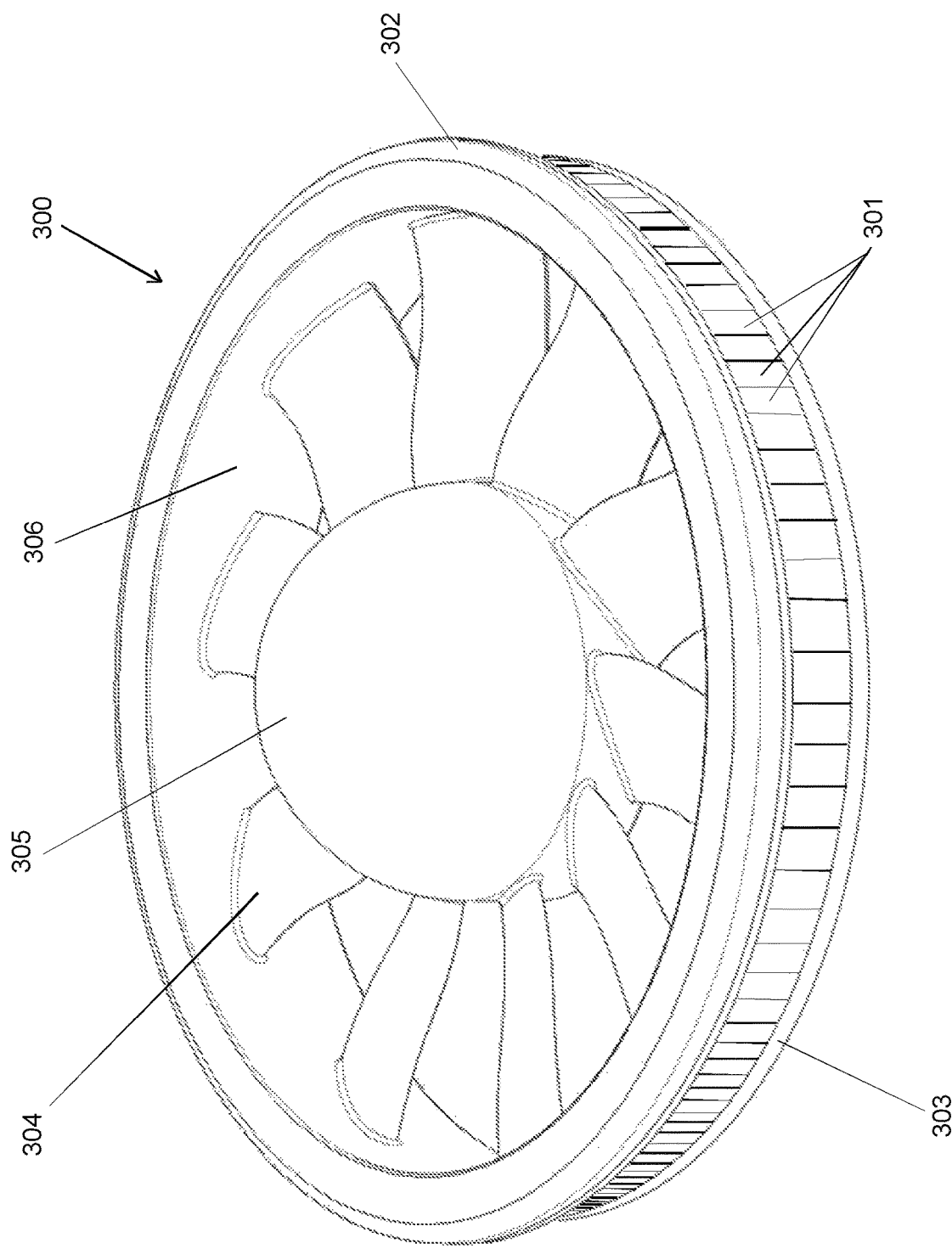
FIG. 3 shows a perspective view of an assembled thrust producing split flywheel gyroscope's hub section according to various embodiments described herein.

As shown with reference to FIG. 3, the hub gyroscope flywheel section 300, which may be made of lightweight composite materials, aluminum, or another suitable material, is configured to accept a plurality of magnets 301 composed of neodymium or another magnetic material along the gyroscope's exterior perimeter. The magnets are preferably located between superior bearing couple 302, which may be made of lightweight composite materials, aluminum, or another suitable material, and inferior bearing couple 303, which may be made of lightweight composite materials, aluminum, or another suitable material, which is configured to lock the magnets in place. Thrust producing hub spokes 304 connect a central cone portion 305 with a gyroscopic force producing ring 306, which in turn supports the magnets 301. Vertical protrusions separate the magnets when necessary to split the surface area of the gyroscope's perimeter equally. The flywheel spokes 304 of the hub gyroscope section, which may be made of lightweight composite materials, aluminum, or another suitable material, have a cross-section and positive incidence angle to create desired airflow/thrust when rotated. The faster the revolutions of the gyroscope's flywheel, the greater the thrust and gyroscopic effect.

Figure 8:
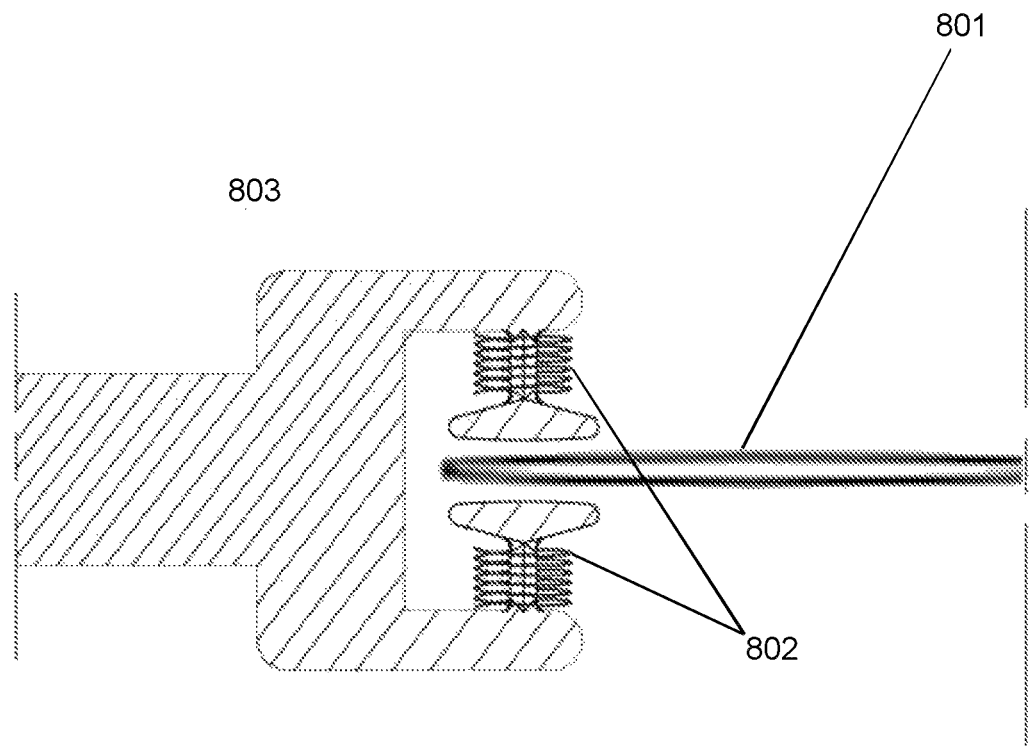
FIG. 8 depicts an alternate embodiment of a gyroscope thrust producing split flywheel gyroscope method and apparatus with magnetic thrust producing spokes/blades, dual field coil positioning, and modified stator to accept dual field coils.

In an alternate embodiment shown in FIG. 8, the gyroscope hub spokes 801 all or in part are composed of magnetic field producing dements, which may be made of magnetic fabrics, neodymium particles, copper, or another magnetic material embedded into a carbon fiber composite structure. The field coils are doubled 802 so that one is positioned above and one is positioned below the slot where the thrust producing spoke moves through to keep it centered. The stator 803 is modified to accept the dual field coils. In an alternate embodiment, a single field coil is positioned above, below, or proximate to the tip of the spoke/blade.

Figure 2:
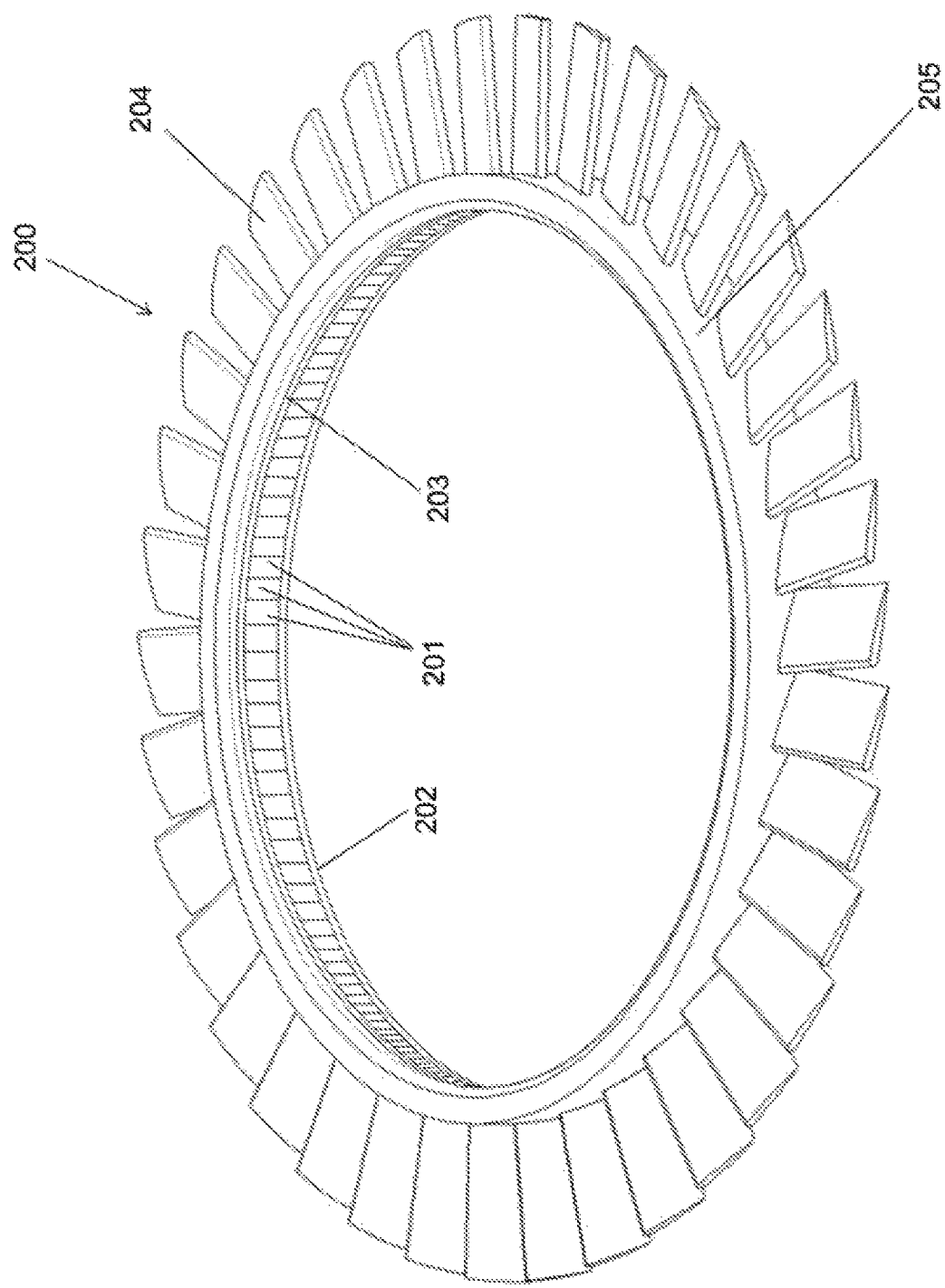
FIG. 2 illustrates a perspective view of an assembled thrust producing split flywheel gyroscope's perimeter section according to various embodiments described herein.
Figure 4:
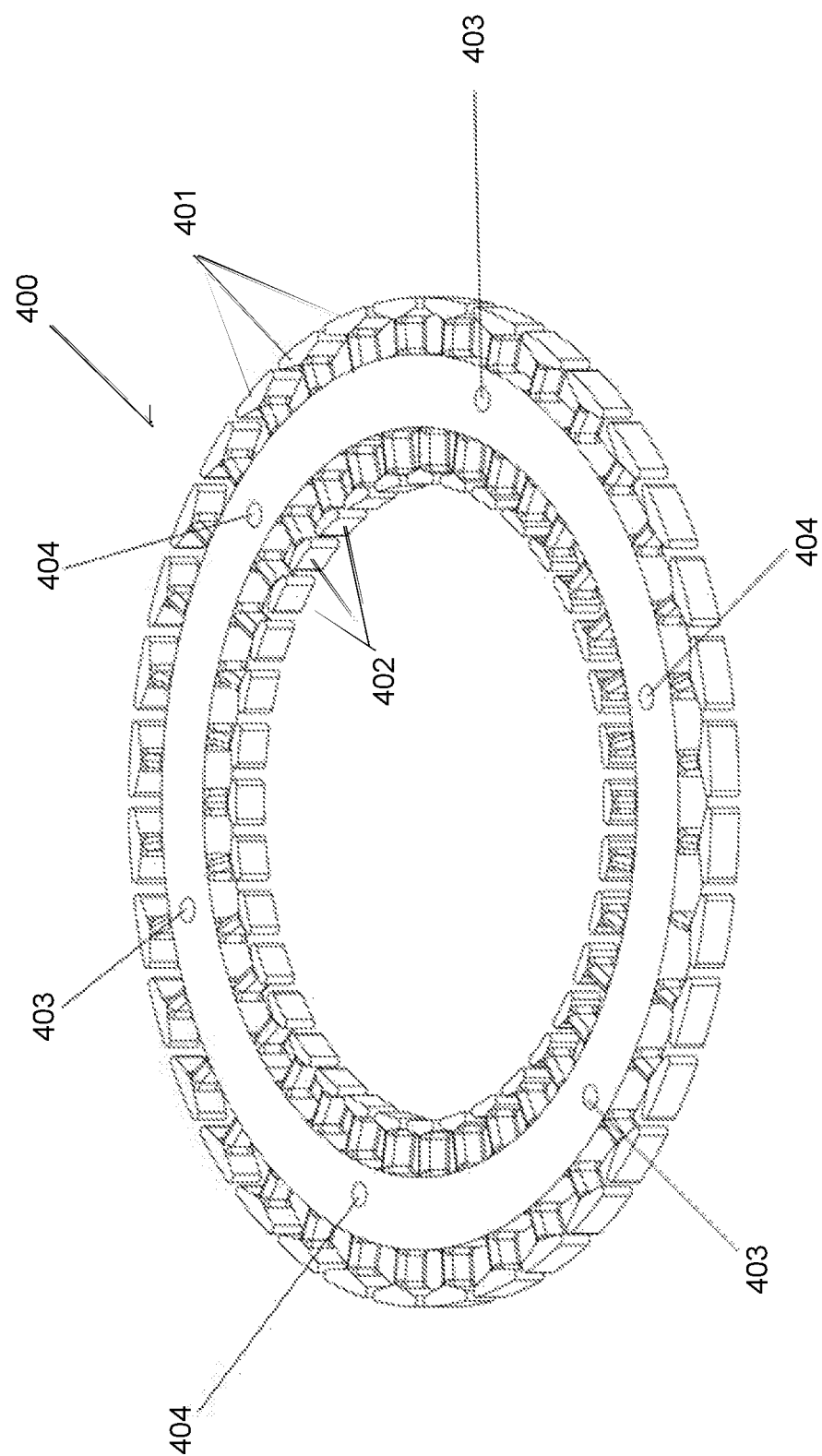
FIG. 4 depicts a perspective view of a two-sided stator's ferrous component used in a thrust producing split flywheel gyroscope method and apparatus.
Figure 5:
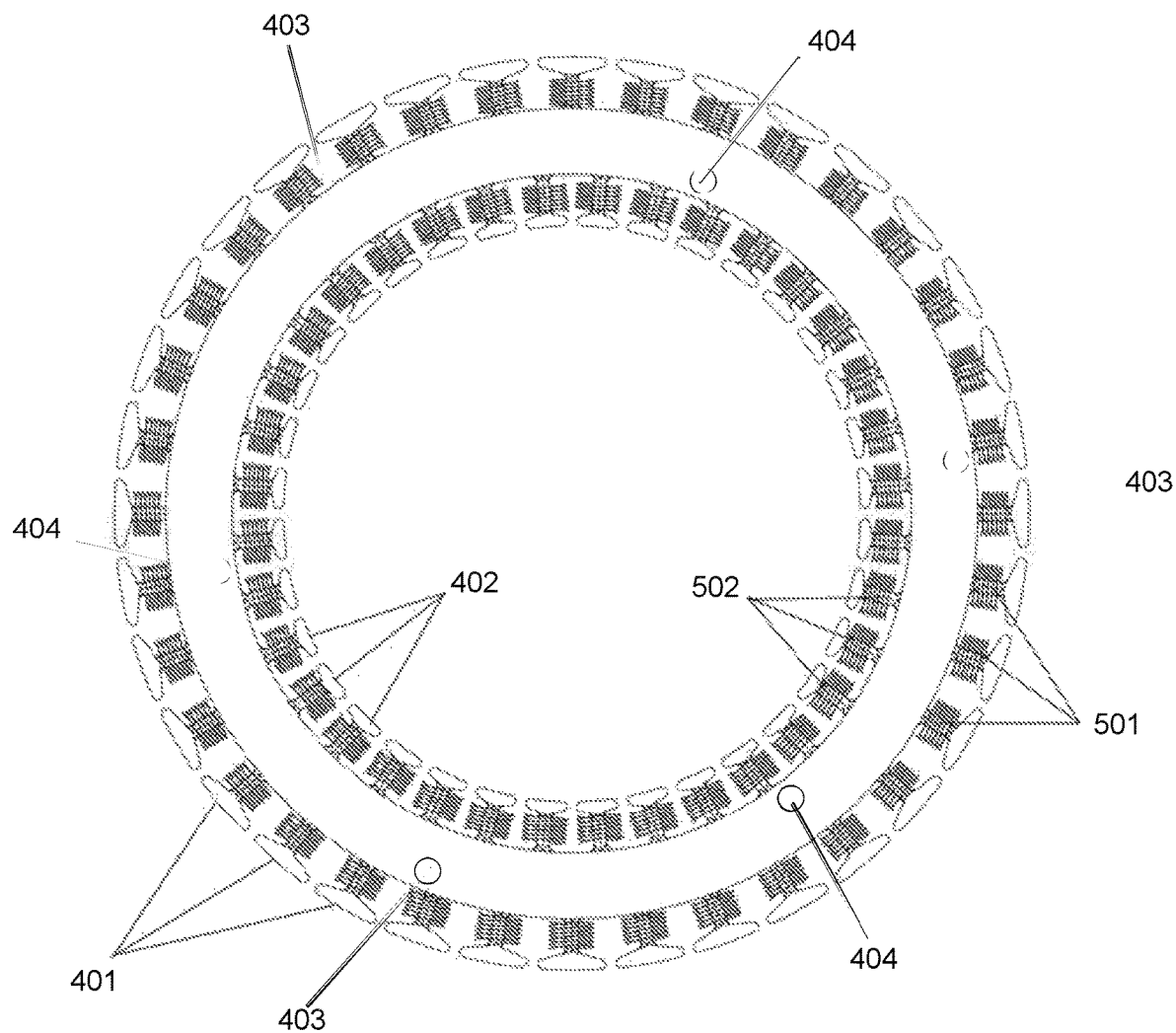
FIG. 5 shows a top view of an assembled two-sided stator used in a thrust producing split flywheel gyroscope method and apparatus depicting the stator and field coils.

As shown further with reference to FIGS. 4 and 5, in the preferred embodiment, a stator 400, which may be made of lightweight ferrous composite materials, iron, or another suitable ferrous material, is located between the perimeter thrust producing flywheel 200 (FIG. 2) and the hub thrust producing flywheel 300 (FIG. 3). A plurality of stator fingers 401, 402 are located both on the outside and inside of the stator. A plurality of exterior field coils 501, which may be made from coated copper wire or other suitable conductive material in a composite such as carbon fiber, are positioned to act upon the magnets 201 of the perimeter flywheel 200 (FIG. 2). A plurality of interior field coils 502, which may be made from coated copper wire or other suitable conductive material in a composite such as carbon fiber, is positioned to act upon the magnets 301 of the hub flywheel 300 (FIG. 3). The field coils are wrapped around the respective stator fingers 401, 402. In an alternate embodiment, the bodywork or shell surrounding the magnetic gyroscope sections produce phasing magnetic fields replacing the stator assembly. The shell is preferably manufactured with a network of electrically conductive materials integrated into its composite matrix or along the shell's surfaces. Alternatively, a ferrous material will be included in the composite.

Figure 6:
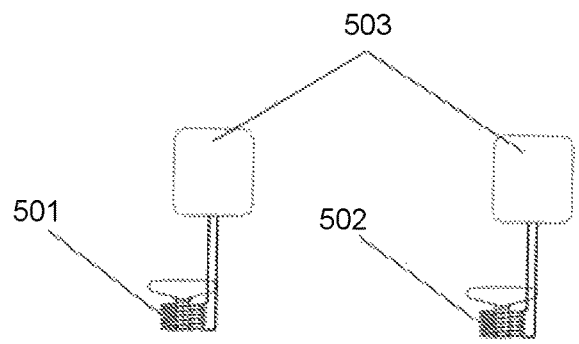
FIG. 6 depicts two of the present invention's field coils connected to two of its motor controllers used in a thrust producing split flywheel gyroscope method and apparatus.

With further reference to FIG. 6, individual field coils 501, 502 are connected to separate motor controllers 503 that dictate the strength of each magnetic field created by the field coils with an infinite number of variations to accommodate different needs placed upon the present invention. The magnetic fields created by the field coils act upon the magnets in the perimeter and hub gyroscope sections to cause counter rotation. The speed of rotation of the gyroscope sections is balanced by the controllers to eliminate rotational torque when desired. In an alternate embodiment, the hub and perimeter gyroscope sections rotate in the same direction. The motor controllers are connected to a central avionics computer, not depicted, to create the desired outcome of thrust, balance and stability. A Chimara Effect simulating gravity neutralization is created through balancing the weight of the vehicle with an equal and opposite force that adjusts to any changes in mass while simultaneously stabilizing and propelling the airframe. The more energy added to the system, the more stable it becomes. The present invention is a self-contained apparatus with no external motors as the assemblies are self-stabilizing gyroscope motors that produce directional airflow that can be used to propel personal air vehicles with no exposed propulsion means.

Figure 7:
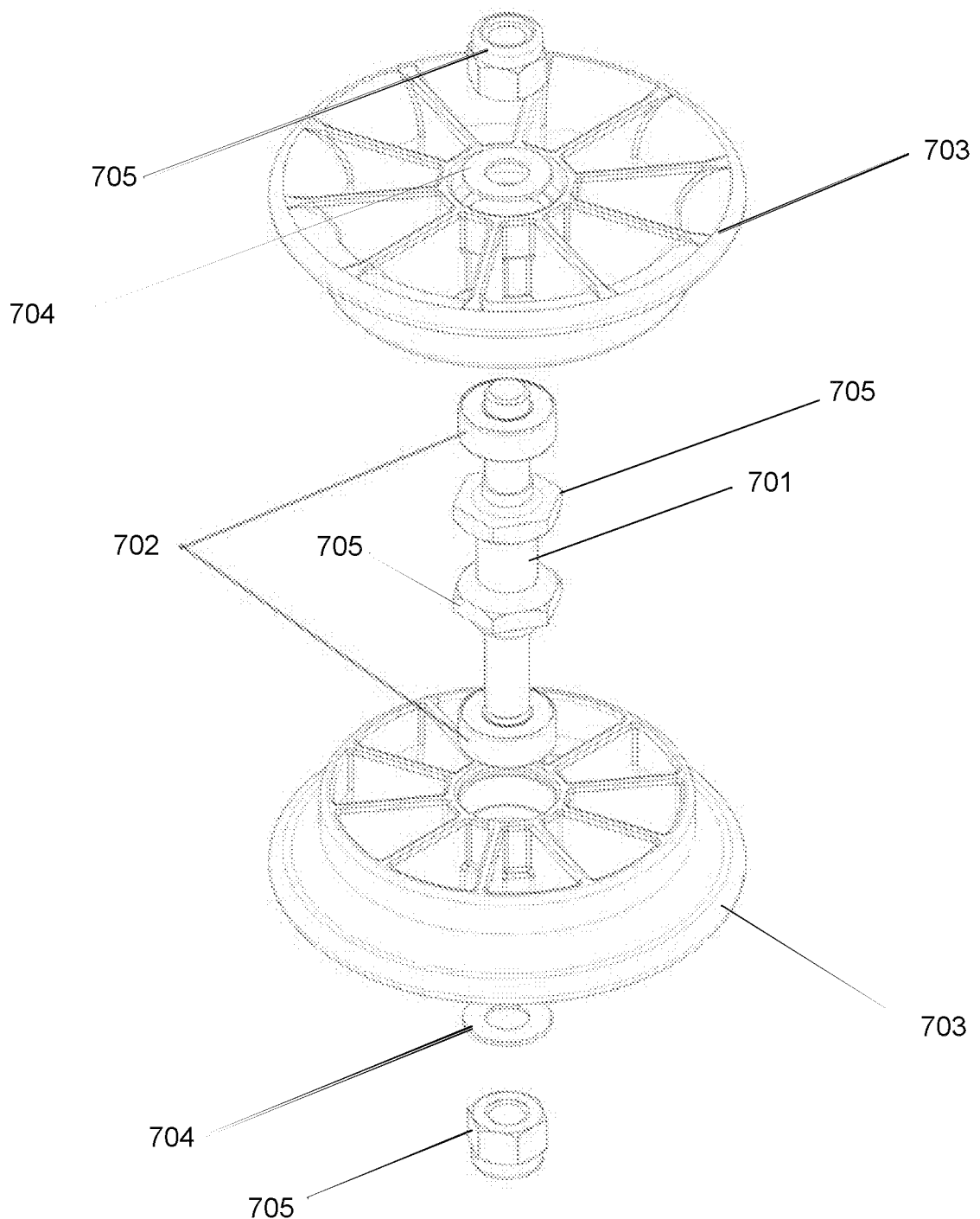
FIG. 7 depicts an example exploded illustration of a bearing system for a thrust producing split flywheel gyroscope method and apparatus.

With further reference to FIG. 7, a plurality of penetrations 403, 404 located in the stator 400 (FIG. 4) support a plurality of rods 701 that locate a plurality of rolling element bearings 702 with a plurality of pulley/sheaves 703, which may be made of lightweight composite materials, aluminum, or another suitable material. This allows the rotation of the gyroscope flywheel sections and transmission of thrust to the surrounding static assemblies. A plurality of washers 704 and locking nuts 705 secure the bearing assembly. The stator penetrations 403, 404 (FIG. 4) are offset so the bearing assemblies located at penetrations 403 only act upon the bearing couples 202, 203 of the perimeter gyroscope section 200 (FIG. 2) while the bearing assemblies located in 404 only act upon the bearing couples 302, 303 of the hub gyroscope section 300 (FIG. 3). In an alternate embodiment, the hub gyroscope section 300 is supported by a centralized bearing system located at the hubs center. A series of tubes, not depicted, connect the central hub bearing system to the stator assembly. In an alternate embodiment, the perimeter flywheel section is supported by a bearing couple located along its exterior diameter. In an alternate embodiment, the bearing system can be replaced with magnetic fields to position the assembly's components and transmit the thrust and gyroscopic effect to the surrounding bodywork/airframe. In an alternate embodiment, the roller bearings and sheaves/pulleys are replaced by a circular bearing, that may be made of lightweight composite materials, aluminum, or other suitable material that encircles each of the gyroscope sections either on the outside or inside of each section.

An upper exterior shell, not depicted, which may be made of lightweight composite materials, aluminum, or another suitable material, can be shaped in such a way as to increase the lift of the present invention and direct air into both sections of the thrust producing flywheels. The exterior shell can integrate non-angled louvres both above and below the thrust producing gyroscope assembly to protect the proximate surroundings from a spoke/blade strike. A lower exterior shell, not depicted, which may be made of lightweight composite materials, aluminum, or another suitable material, can be shaped in such a way as to direct the exiting air flow to allow for increased lift under specific conditions. In an alternate embodiment the lower exterior shell can be shaped into a duct which can channel air, alter air flow, restrict air flow, and release air flow in order to concentrate the downdraft airflow into a smaller area when necessary.

In an alternate embodiment there would be two stators, one located exterior to the perimeter flywheel, and one located interior to the hub flywheel. Magnets in both sections would be moved to be proximate to the respective stators.

In an alternate embodiment, the gyroscope's flywheel is powered by a jet turbine.

In an alternate embodiment, the flywheel is powered by an internal combustion engine.

In an alternate embodiment, multiple perimeter flywheels/rotors can be added to the assembly and are rotatable or fixed.

In an alternate embodiment, in the present invention the perimeter flywheel is rotatable and the stator is split into two sections where the outside section is rotatable with the perimeter flywheel.

The embodiments of the invention in which an exclusive property or privilege is claimed are defined as follows:

1. A flywheel gyroscope assembly, comprising:
   a perimeter section having an inside face and an outside face, comprising:
      a plurality of perimeter spokes extending from the outside face shaped to provide directed thrust when rotated; and
      a plurality of magnets positioned along the inside face;
   a hub section having an inside face and an outside face, comprising:
      a plurality of magnets positioned along the outside face of the hub section; and
      a plurality of hub spokes extending inward from the inside face of the hub section and configured to produce thrust when rotated; and
   a stator having a plurality of exterior field coils along its outside diameter and plurality of interior field coils along its inside diameter, wherein the plurality of exterior field coils are positioned to act upon the magnets of the perimeter section and the plurality of interior field coils are positioned to act upon the magnets of the hub section to create counter rotation of the plurality of perimeter spokes and the plurality of hub spokes.

2. The flywheel gyroscope assembly of claim 1, wherein the hub section further comprises a ring forming the outside face of the hub section, wherein the plurality of magnets is supported along the ring on the outside face of the hub section.

3. The flywheel gyroscope assembly of claim 1, wherein the plurality of exterior field coils and the plurality of interior field coils are individually controlled by separate microprocessors.

4. A flywheel gyroscope assembly comprising:
   a perimeter section having an inside face and an outside face, comprising:
      a plurality of perimeter spokes extending from the outside face shaped to provide directed thrust when rotated; and
      a plurality of magnets positioned along the inside face;
   a hub section comprising:
      a central cone;
      a plurality of hub spokes extending outward from the central cone and configured to produce thrust when rotated, wherein the hub spokes are composed at least in part of magnetic field producing elements; and
   a stator having a plurality of exterior field coils along its outside diameter and plurality of interior field coils along its inside diameter, wherein the plurality of exterior field coils are positioned to act upon the magnets of the perimeter section and the plurality of interior field coils are positioned to keep the hub spokes centered relative to the stator and to act upon the magnetic field producing elements of the hub spokes to create counter rotation of the plurality of perimeter spokes and the plurality of hub spokes.

5. The flywheel gyroscope assembly of claim 4, wherein the plurality of exterior field coils and the plurality of interior field coils are individually controlled by separate microprocessors.

* * * * *